(12) United States Patent
Wang

(10) Patent No.: US 10,710,774 B2
(45) Date of Patent: Jul. 14, 2020

(54) PACKAGING TUBE COMPRISING FLAVOR BARRIER COMPOSITION

(71) Applicant: COLGATE-PALMOLIVE COMPANY, New York, NY (US)

(72) Inventor: Jun Wang, Fort Washington, PA (US)

(73) Assignee: Colgate-Palmolive Company, New York, NY (US)

( * ) Notice: Subject to any disclaimer, the term of this patent is extended or adjusted under 35 U.S.C. 154(b) by 441 days.

(21) Appl. No.: 15/505,076

(22) PCT Filed: Aug. 19, 2014

(86) PCT No.: PCT/US2014/051707
§ 371 (c)(1),
(2) Date: Feb. 18, 2017

(87) PCT Pub. No.: WO2016/028280
PCT Pub. Date: Feb. 25, 2016

(65) Prior Publication Data
US 2019/0152653 A1 May 23, 2019

(51) Int. Cl.
*B65D 35/08* (2006.01)
*B65D 35/10* (2006.01)
*C08L 23/06* (2006.01)
*C08L 23/08* (2006.01)

(52) U.S. Cl.
CPC ............ *B65D 35/08* (2013.01); *B65D 35/10* (2013.01); *C08L 23/06* (2013.01); *C08L 23/0823* (2013.01); *C08L 23/0861* (2013.01); *C08L 2205/03* (2013.01); *C08L 2207/062* (2013.01)

(58) Field of Classification Search
CPC . B65D 35/08; C08L 23/0861; C08L 23/0853; C08L 23/0823; C08L 2205/03; C08L 2207/062
USPC .............. 428/35.7, 36.6, 36.91, 36.92
See application file for complete search history.

(56) References Cited

U.S. PATENT DOCUMENTS

| 5,534,351 A * | 7/1996 | Pearson ............. C08J 5/18 |
| | | 428/36.7 |
| 5,927,550 A * | 7/1999 | Mack ............. B65D 35/22 |
| | | 222/94 |
| 6,042,906 A | 3/2000 | Itoh et al. |
| 2006/0046006 A1 | 3/2006 | Bastion et al. |
| 2009/0026198 A1* | 1/2009 | Ichikawa ......... B29B 11/08 |
| | | 220/62.22 |
| 2009/0208685 A1 | 8/2009 | Rivers et al. |

(Continued)

FOREIGN PATENT DOCUMENTS

| CN | 1496683 A | 5/2004 |
| CN | 101437680 A | 5/2009 |
| JP | H10-34845 | 2/1998 |

OTHER PUBLICATIONS

International Search Report and the Written Opinion of the International Searching Authority issued in International Application PCT/US2014/051707 dated May 12, 2015.

*Primary Examiner* — Lee E Sanderson
*Assistant Examiner* — Michael C Romanowski

(57) ABSTRACT

Provided is a tube structure for packaging products. The tube structure can include a tube body and a tube shoulder/nozzle. The tube shoulder/nozzle can include a barrier material. The barrier material can include high density polyethylene (HDPE), ethylene vinyl alcohol (EVOH) copolymer and cyclic olefin copolymer (COC).

15 Claims, 6 Drawing Sheets

(56) References Cited

U.S. PATENT DOCUMENTS

| | | |
|---|---|---|
| 2009/0294457 A1 | 12/2009 | Shi et al. |
| 2009/0324864 A1 | 12/2009 | Miller et al. |
| 2013/0333787 A1 | 12/2013 | Shi et al. |
| 2014/0076928 A1* | 3/2014 | Banerjee .................. B32B 1/08 428/36.6 |
| 2017/0021976 A1* | 1/2017 | Wang ..................... B29C 49/22 |

* cited by examiner

PACKAGING TUBE COMPRISING FLAVOR BARRIER COMPOSITION

BACKGROUND

Tube containers, such as dispensing tubes, are used to hold and to dispense a wide range of products. These include adhesives, lubricants, lotions, medicants, shampoos, hair dressings, and various oral care products. Some of the lotions, medicants and oral care products contain an antibacterial compound. A problem with such products is that the antibacterial compound may be absorbed or otherwise degraded by the tube materials. The result is that the tube structure needs to be modified to reduce or to eliminate the absorption by the tube structure for the antibacterial compound. In many cases, and especially for oral care products such as toothpaste, it is desirable also to reduce the absorption of the tube structure for other contained substances such as flavors and fragrances. Some package materials absorb flavor and fragrance components in an inappropriate ratio depending on the flavor and fragrance molecules. Thus the flavor or fragrance is changed. This problem needs to be solved for flavors and fragrances to preserve the taste and olfactory properties of the products.

Traditionally, barrier materials have been used to reduce the loss of flavors or fragrances, and in some instances antibacterial compounds. It is widely believed in the industry that a good barrier to flavors and to fragrances is also a good barrier to antibacterial compounds, and that barrier improvement would be similar for all of these organic compounds. The barrier layer is normally selected based on the flavor or fragrance barrier properties. Unfortunately, the traditional belief that a good flavor barrier leads to a good barrier for antibacterial compounds is not accurate. Polymers will have different adsorption affinities for flavors and for antibacterial compounds because of the differences in structure and polarity of these compounds.

Additionally, the shoulder/nozzle portion of the tubes poses issues, for example, with respect to flavor or antibacterial compound loss, because the shoulder and nozzle are relatively thick compared to the remainder of a tube to maintain the mechanical strength of the tube. Further, in order to have good adhesion of the tube body to the shoulder and for cost considerations, polyolefins are usually used as the material for the shoulder/nozzle. The thicker the polymers the greater the absorption. This thickness leads to an unacceptable level of antibacterial compound adsorption. This problem is thought to be solved for flavors by the use of an insert which is a material that has a very low absorptivity for the flavor components. This insert can be formed by an interference fit into the top part of the tube, a film layer onto the inner surface of the tube, or by a layer co-injection molded onto the inner surface of the tube. In these cases, the insert can be disposed on or above a surface of the shoulder/nozzle (i.e., there may be additional laminate layers included). However, the use of inserts requires additional manufacturing steps.

There is a need for dispensing tubes that provide performance equal to or better than existing tubes, but which minimize permeability that reduces the quality of the contents in the tube, and reduces manufacturing costs and operational steps.

BRIEF SUMMARY

As used herein the term shoulder/nozzle refers to the shoulder and nozzle portions of a tube container as one part or as two separate parts.

In an embodiment, there is a tube structure for packaging products. The tube structure can include a tube body and a tube shoulder/nozzle. The tube shoulder/nozzle can include a barrier material blend. The barrier material blend can include high density polyethylene (HDPE), ethylene vinyl alcohol (EVOH) copolymer and cyclic olefin copolymer (COC).

In another embodiment, there is a method of making a tube shoulder/nozzle, comprising: forming a resin blend composition comprising HDPE, EVOH and COC; and molding the resin blend composition into the tube shoulder/nozzle.

In yet another embodiment, there is a barrier resin blend composition, comprising HDPE, EVOH, and COC.

Advantages of at least one embodiment include a cost-effective barrier incorporated in a shoulder/nozzle for small sized tubes, which have a high surface-to-volume ratio, such as those having tube volume of less than or equal to about 50 mL, for example, such as those having tube volume of about 5 mL to about mL. Another advantage of such a barrier can provide tubes, such as those having volumes in the above ranges, including 22 mL small tubes, with an acceptable shelf life comparable to those of larger tubes (i.e., tubes having volumes of greater than about 50 mL). The cost-effectiveness from practice of the embodiments result from material savings as no additional insert is needed, and operational savings as one molding process for the shoulders is required and no shoulder/insert assembling, or special surface treatment, e.g., plasma coating and aluminum sputter coatings, or integrating a barrier layer within the shoulder, is needed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description of the preferred embodiments is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

Ethylene vinyl alcohol copolymer (EVOH) and Cyclic Olefin Copolymer (COC) are two materials that can be used in barrier resins used in barrier films. EVOH is commonly used as an oxygen barrier in food packaging. It keeps air out and flavors in the package. EVOH is a highly transparent, weather resistant, oil and solvent resistant, flexible, moldable, recyclable, and even printable material. COC is an amorphous polymer. Typical COC material has a higher modulus than HDPE and PP. It has a high moisture barrier for a clear polymer along with a low absorption rate. Some properties of COCs vary due to monomer content, e.g., the glass transition temperature, viscosity, and stiffness. TOPAS® COCs are made from ethylene and norbornene. A general structure for a COC is represented by structure I below:

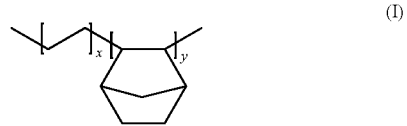

(I)

Embodiments described herein provide a barrier material that, for example, reduces the loss of flavor molecules and antibacterial additives in the formulations from a tube shoulder/nozzle and provide a high barrier material to keep those active organic molecules within the tubes during the whole product shelf-life. In an embodiment there is a barrier material comprising a material, for example a resin, such as a tri-component blend that includes HDPE, EVOH, and COC. In other words, the barrier material can comprise an HDPE/EVOH/COC blend. In an embodiment, the EVOH component of the barrier material comprises 5-20 wt %, the COC comprises 5-20 wt %, and the HDPE comprises 60-90 wt %. In an embodiment, the resin includes a composition that consists of HDPE, EVOH, and COC. In an embodiment, the resin includes a composition that consists essentially of HDPE, EVOH, and COC.

Figure 1:
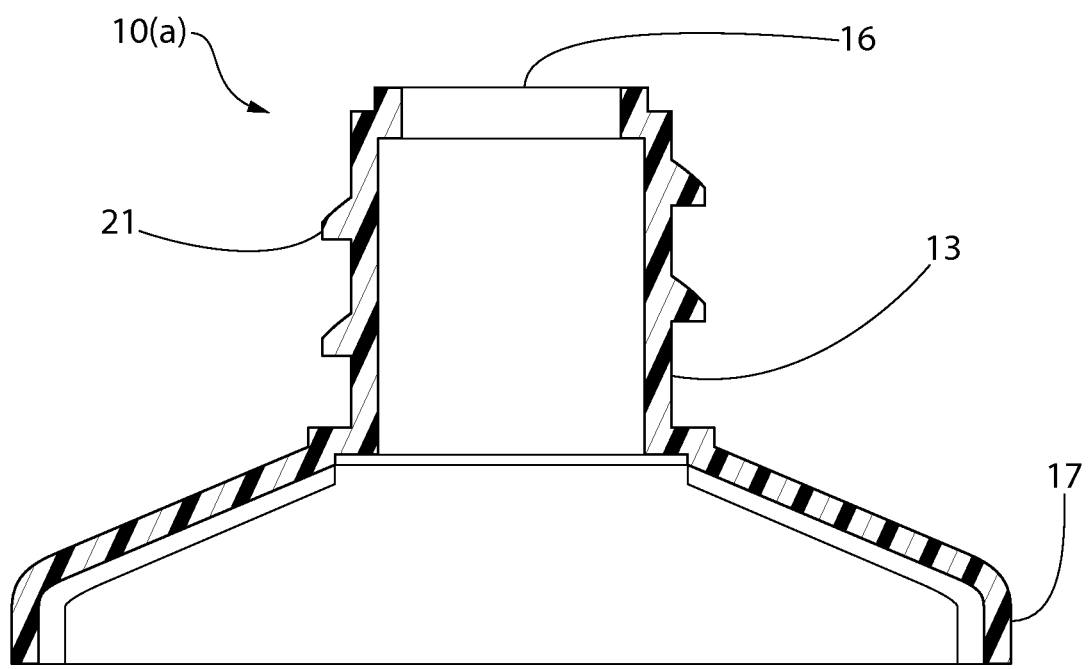
FIG. 1 is a side elevation view of the shoulder/nozzle comprising a tri-component blend of an embodiments.
Figure 2:
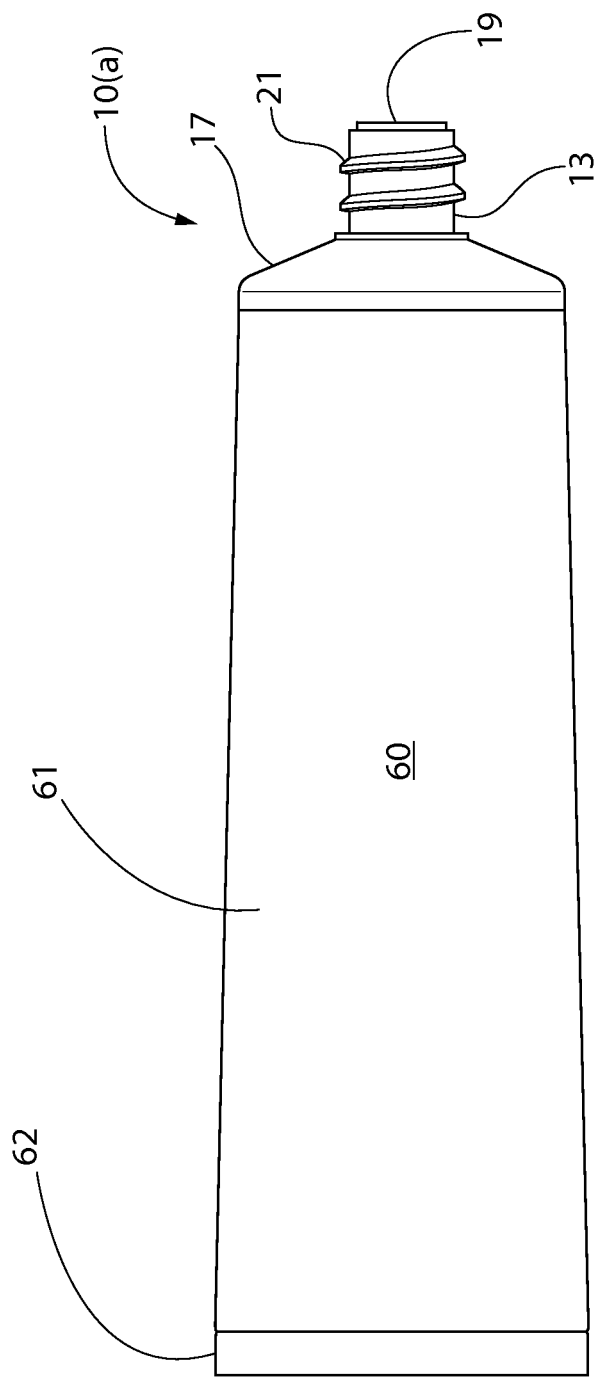
FIG. 2 is a side elevation view of a tube with the shoulder/nozzle of FIG. 1.

FIG. 1 shows shoulder/nozzle 10(a) comprising a nozzle 13 and the shoulder 17. The nozzle has an aperture 16 and threads 21 for the attachment of a closure. The shoulder/nozzle can be a molded piece formed from HDPE or a tri-component barrier material blend, such as a tri-component barrier material that comprises HDPE, EVOH copolymer, and cyclic olefin copolymer. Thus, the shoulder 17, or both the shoulder 17 and the nozzle 13 can comprise the barrier material blend. FIG. 2 shows a tube 60 with a tube body 61 and a tube closing crimp 62. On the other end is the shoulder/nozzle 10(a) with nozzle 13, shoulder 17, aperture 16 and threads 21. The tube body 60 can be comprised of any of the known tube structures disclosed and/or used in the prior art. Usually these tube body structures will be a laminate and have a barrier layer of a metal foil, a polyester, polyamide, or an ethylene vinyl alcohol copolymer. The tube 60 can have a volume of less than or equal to about 50 mL, for example from about 20 mL to about 50 mL.

The shoulder/nozzle 10(a) can be molded from a resin, for example, a tri-component barrier material resin, into a predetermined shape. In other words, the resin, for example, the tri-component barrier material resin can be moldable. Accordingly, no additional barrier layer, such as a separate barrier layer insert, is required to be added to the shoulder/nozzle of the embodiments, for example, at an inner surface, because the barrier properties sought to prevent flavor or antibacterial losses are inherent in the tri-component barrier material from which the shoulder/nozzle is molded.

A method of making a tube shoulder/nozzle includes the steps of forming a resin composition, for example, a tri-component resin blend composition, comprising HDPE, EVOH and COC, and molding the tri-component resin blend composition into a predetermined shape.

In an embodiment, the shoulder/nozzle has a thickness between about 350 microns to about 650 microns, preferably about 450 microns to about 550 microns.

The barrier material can be made of a tri-component resin blend composition and can comprise a blend ratio for HDPE/EVOH/COC of about 60/20/20 to about 90/5/5 by weight. In an embodiment, permeability of flavor materials, such as limonene, in the tube shoulder/nozzle is less than about $3.00 \times 10^{-10}$ g·cm/cm²·s.

High-Density Polyethylene (HDPE)

The HDPE in the tri-component barrier material can be present in an amount of about 60 wt % to about 90 wt %. The HDPE of the embodiments can be any injection molding grade HDPE with a density between 0.945 to 0.965 g/cm³ (ASTM or ISO 1183 D 792), a melt index between 4 to 25 g/10 min @190° C./2.16 kg (ASTM D 1238 or ISO 1133), and a melting point between 115-135° C. (DSC method), such as Lyondell Basell Industries ALATHON® M5350 (available from Lyondell Basell Industries, Houston, Tex.), DOW™ DMDA 8007-NT7 (available from The Dow Chemical Company, Midland, Mich.), DOW™ Polyethylene 12450N (available from The Dow Chemical Company, Midland, Mich.) and the like.

Ethylene Vinyl Alcohol Copolymer (EVOH)

The EVOH in the tri-component barrier material can be present in an amount of about 5 wt % to about 20 wt %. The EVOH of the embodiments can be high barrier EVOH with the vinyl alcohol content of 65 mol % and higher, the $O_2$ Transmission Rate @ 0% RH, 20° C. of 0.1-0.3 cm³·20 µm/m²·day·atm (ISO 14663-2), Melt Temperature of 175-195° C. (ISO 11357), such as EVAL™ F (with 68 mol % of vinyl alcohol; available from Kuraray Co., Ltd., Houston, Tex.) and EVAL™ L (with 73 mol % of vinyl alcohol; available from Kuraray Co., Ltd., Houston, Tex.) series EVAL™ EVOH resins, for example EVAL™ LT171B, EVAL™ F104, and the like.

COC

The COC in the tri-component barrier material can be present in an amount of about 5 wt % to about 20 wt %. The COC of the embodiments can be COC with heat deflection temperature of 130° C. and higher. The COC of the embodiments can have a water vapor permeability (at 23° C. and 85% relative humidity, DIN 53 122) between 0.03 to 0.05 g·mm/m²·d. The COC of the embodiments can have good water-repelling property and their water absorption after immersion for 24 h/23° C. is only 0.01%, ten times smaller than that of polycarbonate and poly(methyl methacrylate). An example is TOPAS® grade 6017 (available from Topas Advanced Polymers, Inc., Florence, Ky.).

Preferably the tubes should be rugged, able to withstand the rigors of transport, temperature variation, and use by consumers. The tubes are preferably thin enough to be readily deformable, so the paste can be easily squeezed out of the tube, yet tough enough to withstand significant pressures in filling and in use. Finally, the materials and manufacturing costs should be as low as possible, as packaging may constitute a significant fraction of the cost of goods for many products using dispensing tubes.

EXAMPLES

Example 1

Comparative Barrier Resins

HDPE was blended with COC, EVOH at ratios: 75/25 and 90/10, respectively. The diffusion coefficient (D) and the solubility (S) of the flavor molecules were measured and the permeability (P) was calculated by P=D×S. Two flavor molecules, i.e., limonene, anethole, were used.

Figure 3A:
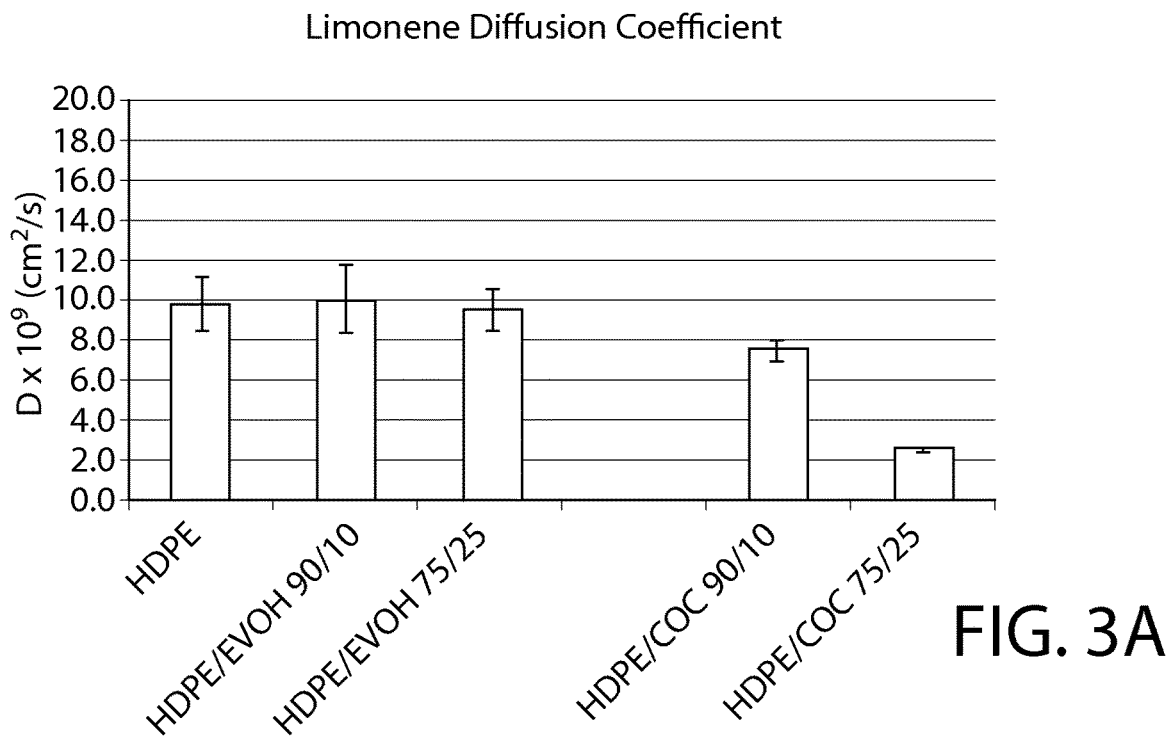
FIG. 3A-3C are graphs showing diffusion, solubility and permeability results for limonene flavor molecules through barriers comprising comparative resin blends.
Figure 3B:
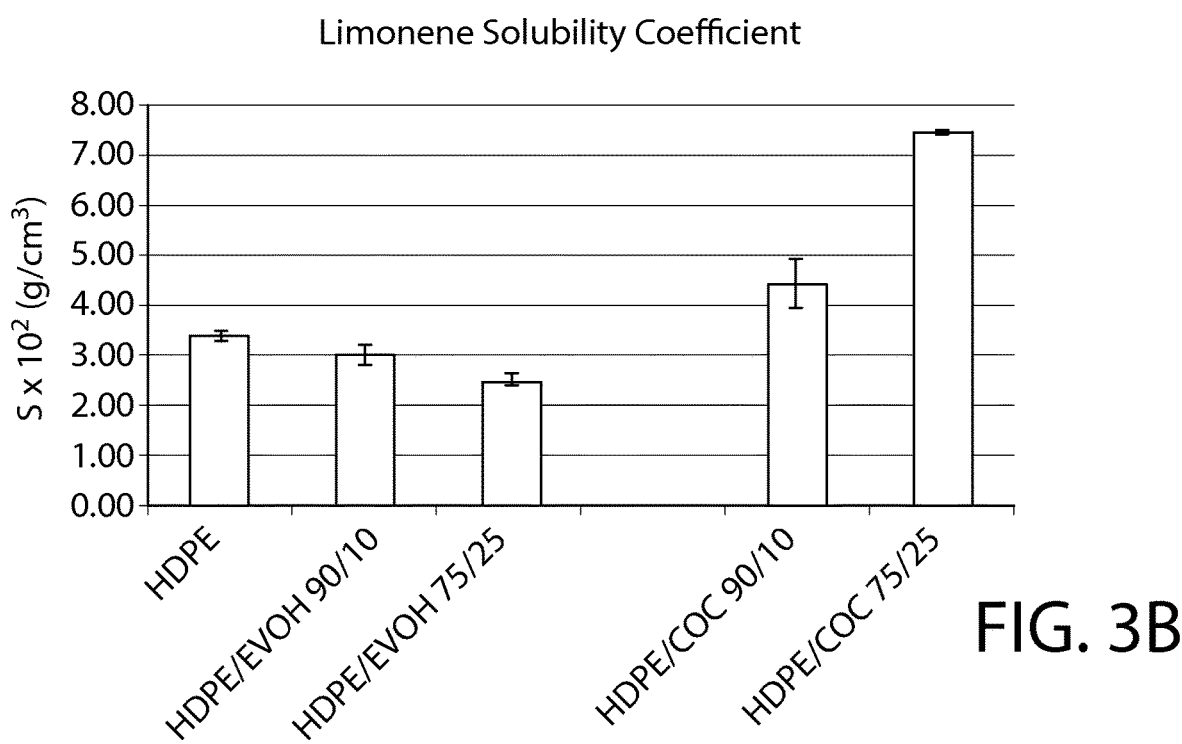

Results for limonene are shown in Table 1 below and represented in the graphs of FIGS. 3A-3C while those for anethole are shown in Table 2 below and represented in the graphs of FIGS. 4A-4C.

Figure 3C:
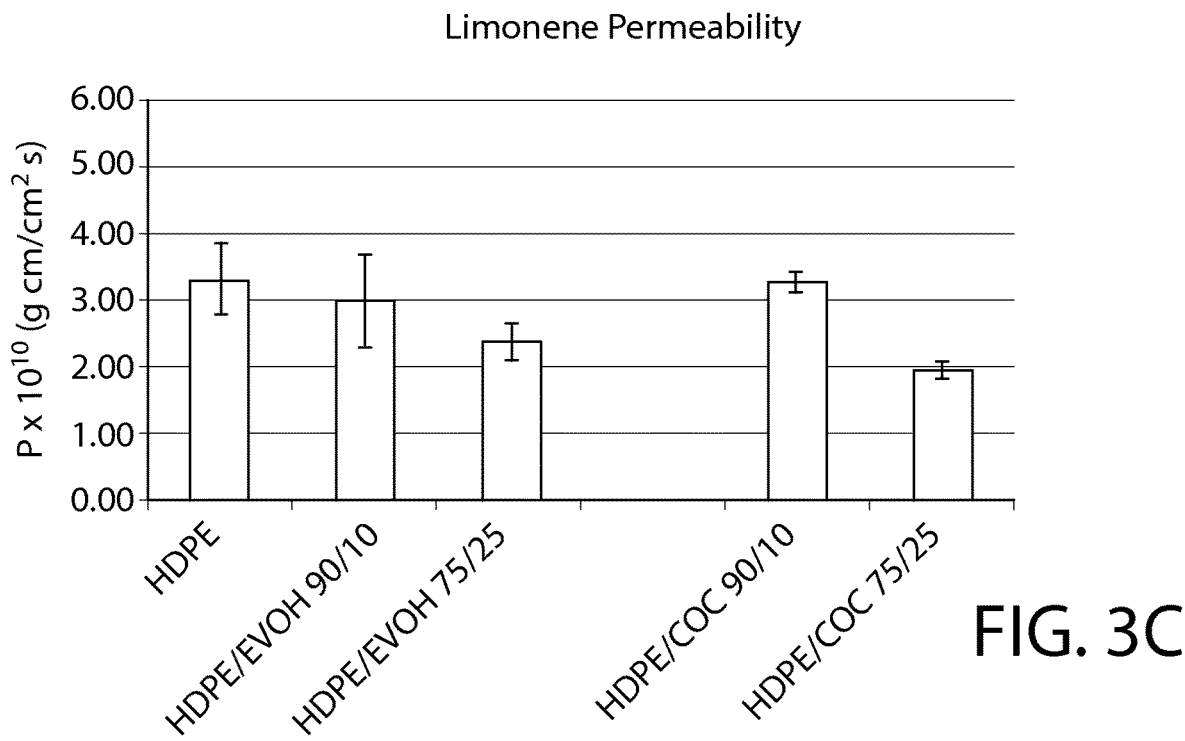
Figure 4A:
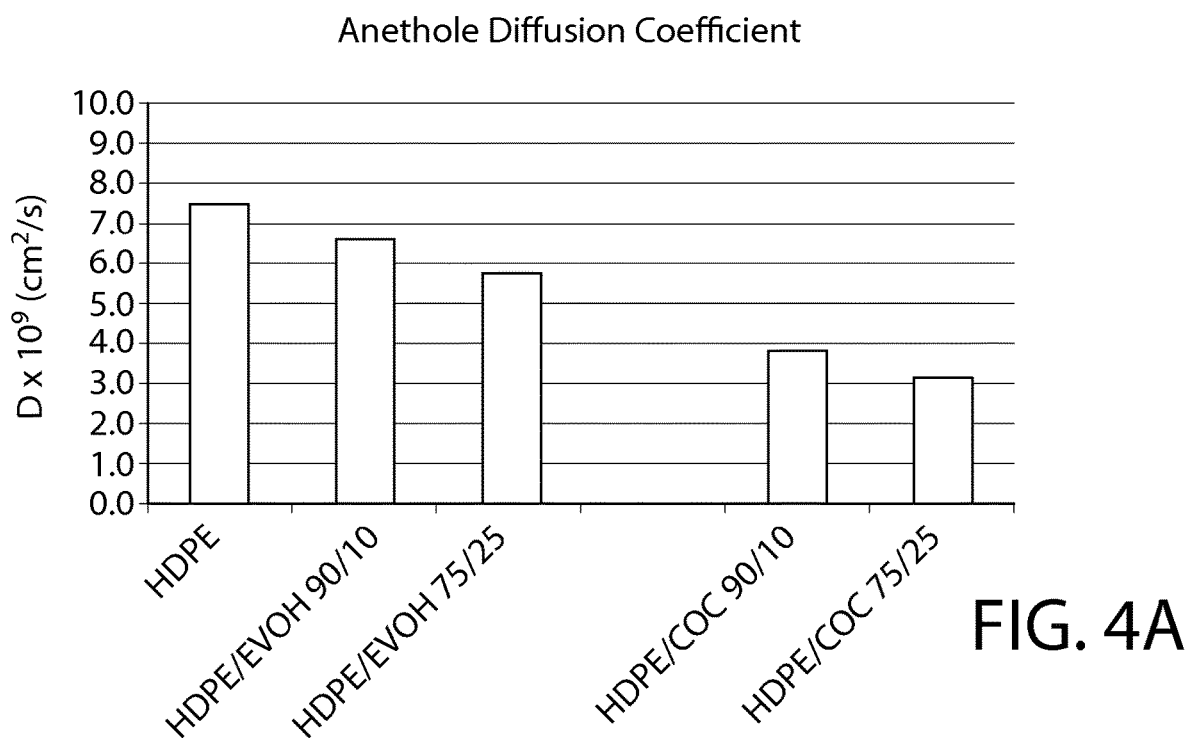
FIG. 4A-4C are graphs showing diffusion, solubility and permeability results for anethole flavor molecules through barriers comprising comparative resin blends.
Figure 4B:
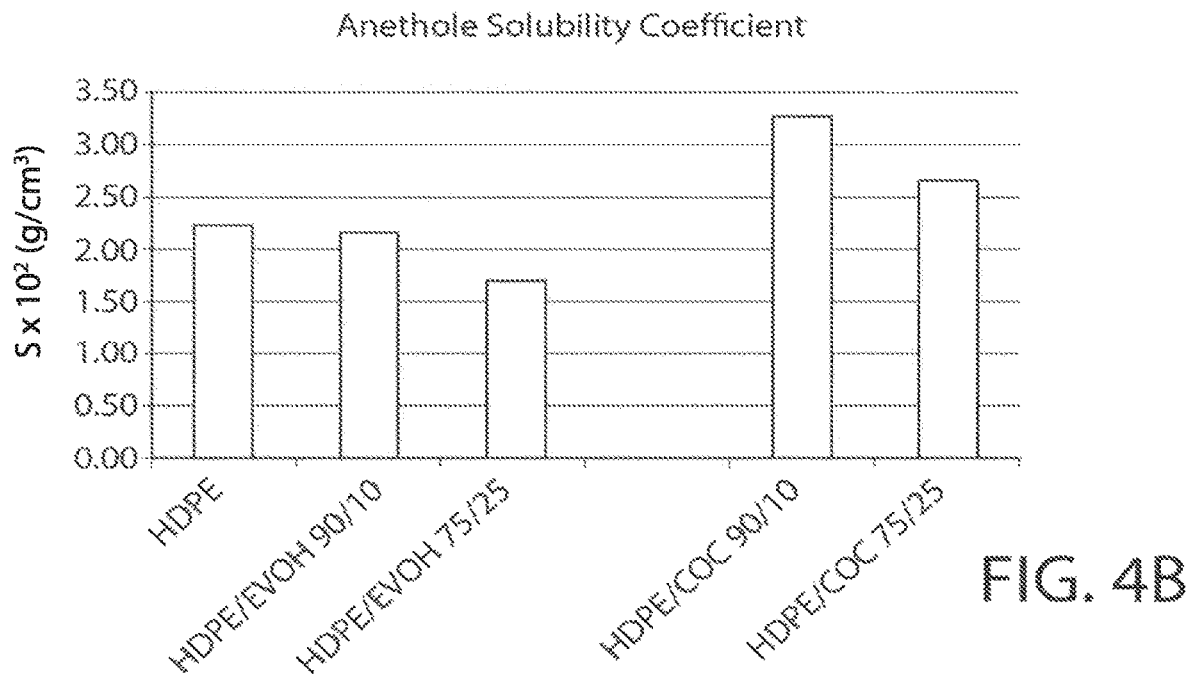
Figure 4C:
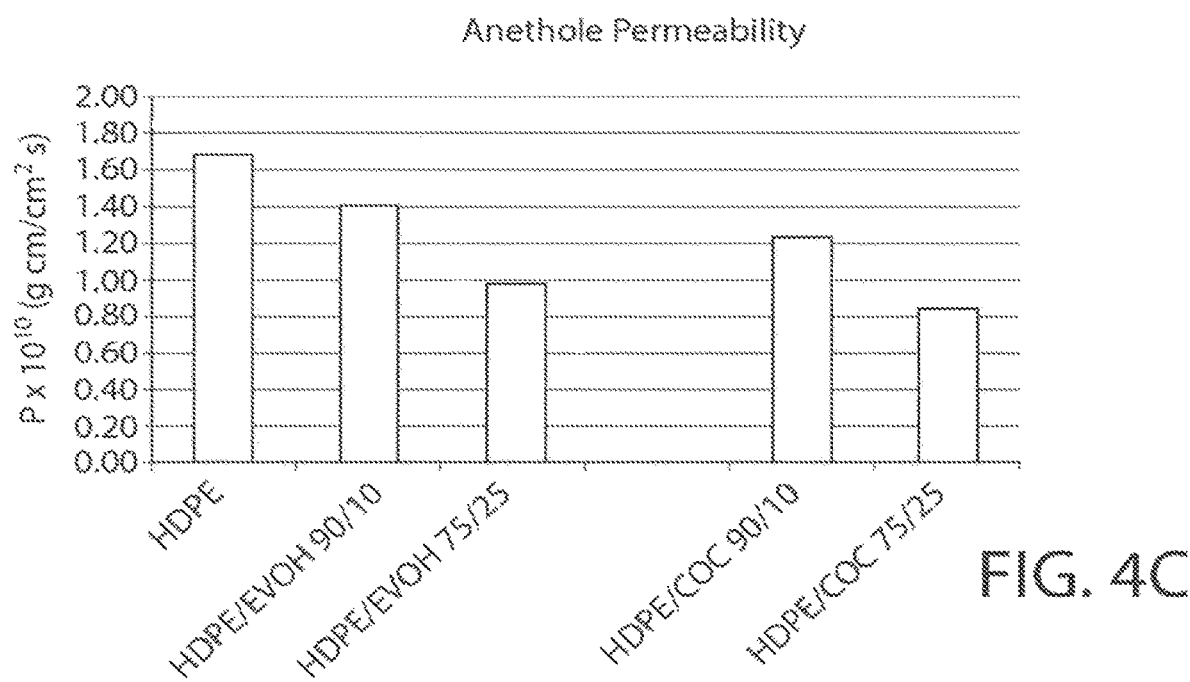

FIG. 3C and FIG. 4C show that both EVOH and COC provide lower permeability as compared to HDPE, but via different mechanism. EVOH reduced both D and S, and COC reduced the D quite a lot but increased S.

TABLE 1

Limonene Diffusion (D), Solubility (S) and Permeability (P) Coefficients

| Composition (Wt) | $D \times 10^9$ (cm$^2$/s) | $S \times 10^2$ (g/cm$^3$) | $P \times 10^{10}$ (g cm/cm$^2$ s) |
| --- | --- | --- | --- |
| HDPE | 9.8 ± 1.3 | 3.38 ± 0.12 | 3.33 ± 0.54 |
| HDPE/EVOH (90/10) | 10.0 ± 1.7 | 2.98 ± 0.19 | 2.99 ± 0.66 |
| HDPE/EVOH (75/25) | 9.6 ± 1.1 | 2.48 ± 0.09 | 2.37 ± 0.27 |
| HDPE/COC (90/10) | 7.5 ± 0.5 | 4.35 ± 0.49 | 3.25 ± 0.15 |
| HDPE/COC 75/25 | 2.6 ± 0.2 | 7.49 ± 0.05 | 1.93 ± 0.13 |

TABLE 2

Anethole Diffusion (D), Solubility (S) and Permeability (P) Coefficients

| Composition (Wt) | $D \times 10^9$ (cm$^2$/s) | $S \times 10^2$ (g/cm$^3$) | $P \times 10^{10}$ (g cm/cm$^2$ s) |
| --- | --- | --- | --- |
| HDPE | 7.6 | 2.22 | 1.68 |
| HDPE/EVOH (90/10) | 6.6 | 2.15 | 1.41 |
| HDPE/EVOH (75/25) | 5.7 | 1.71 | 0.98 |
| HDPE/COC (90/10) | 3.8 | 3.26 | 1.22 |
| HDPE/COC 75/25 | 3.2 | 2.65 | 0.84 |

Example 3

Exemplary Barrier Material

A tri-component blend of HDPE/EVOH/COC was used to provide a good barrier material for flavor protection. The amount of EVOH was selected to be in the range of about 5 wt % to about 20 wt %, the amount of COC was selected from the range of about 5 wt % to about 20% wt %, and the amount of HDPE was selected from the range of about 60 wt % to about 90 wt %. For example, resins of HDPE, EVOH and COC were first dry mixed according to the weight percentages described above, along with a 2 phr (parts per hundred) white pigment masterbatch. The mixed blend was then compounded at 230-270° C. in either a single-screw or a twin-screw extruder. The extrudant was pelletized and then fed into an injection molding machine with the multi-cavity molds of tube shoulders. The injection molding barrel temperature, hot runner temperature and mold temperature was set to 210-250° C., 200-240° C. and 10-30° C., respectively.

Example 4

Barrier Material Testing

Figure 5:
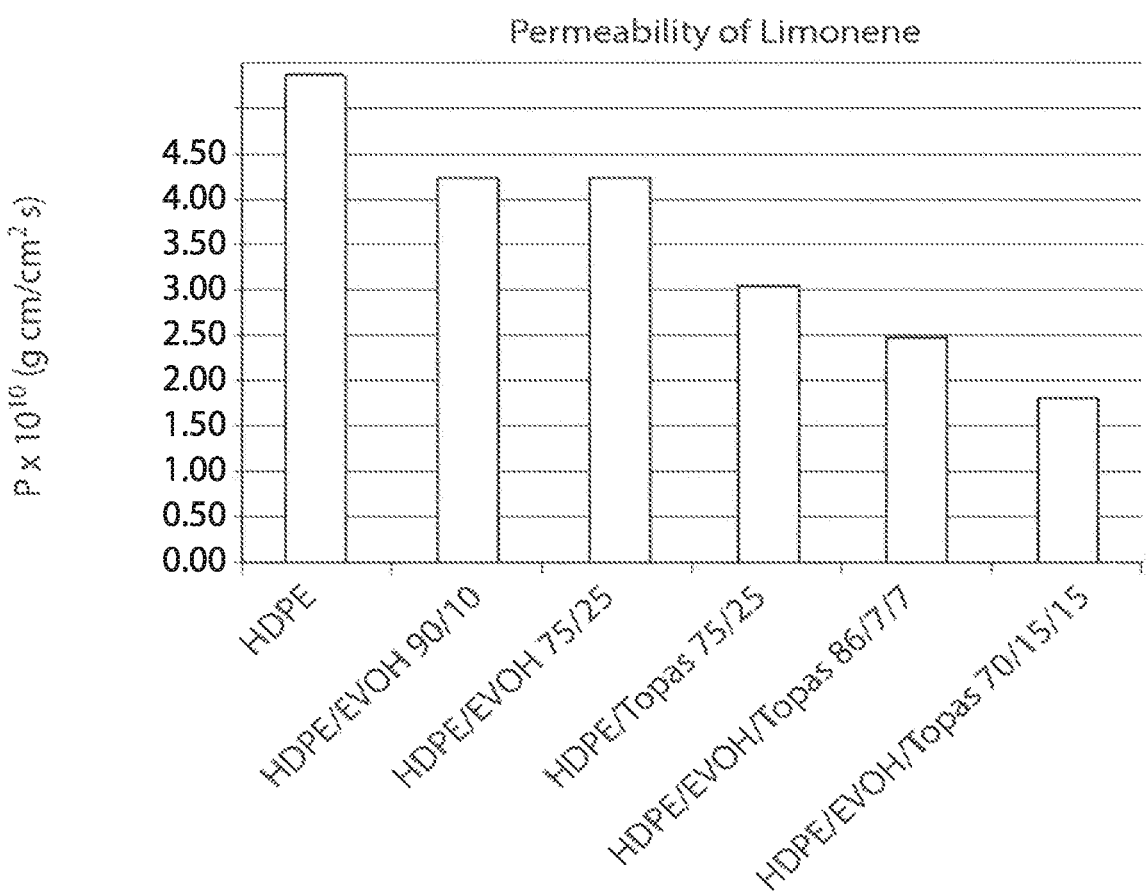
FIG. 5 is a graph comparing the permeability of limonene through comparative barriers and through an exemplary barrier comprising a tri-blend of an embodiment.

A blend comprising HDPE, EVOH and COC was used to obtain the maximum reduction of P of flavor molecules. For example, as shown in Table 3 and illustrated in the graph of FIG. 5, the flavor permeability in the blends decreased 40-80% from that in HDPE. At a HDPE/EVOH/COC blending ratio of 70/15/15, the permeability of limonene decreased two thirds, from $5.3 \times 10^{-10}$ g·cm/cm$^2$·s to $1.8 \times 10^{-10}$ g·cm/cm$^2$·s; at a lower usage of barrier resin, i.e., HDPE/EVOH/COC blending ratio of 86/7/7, the limonene permeability also decreased a little bit over 50%. The selected blends also minimize the scalping of polar compounds, e.g., triclosan, from the product formulations. The permeability (P) was calculated by the product of solubility (S) and diffusion coefficient (or Diffusivity, D), i.e., P=S·D. Both S and D were measured by the following sorption test:

The compounded materials were compression molded into films with a thickness of 300 microns. First, the film was trimmed into strips with dimension of about 0.5"×2", and then the trimmed strips were immersed into testing liquids, such as limonene or anethole. The sorption process of the film was evaluated by weight gain measurement with a microbalance. The film was taken out of the liquid at different time intervals and the residue liquid on the film was completely removed, followed by an isopropanol rinse and dry within one minute. The film weight was then measured and a sorption profile was obtained. The S was obtained from the saturated weight gain and D was derived from the sorption profile calculated using software such as Experimental Diffusion Fit (EXDIF), for example, as an add-on for LABVIEW™ available from National Instruments.

TABLE 3

Limonene Permeability

| Composition (Wt) | HDPE | HDPE/EVOH (90/10) | HDPE/EVOH (75/25) | HDPE/COC (75/25) | HDPE/EVOH/Topas (86/7/7) | HDPE/EVOH/Topas (70/15/15) |
| --- | --- | --- | --- | --- | --- | --- |
| $P \times 10^{10}$ (g cm/cm$^2$ s) | 5.26 | 4.22 | 4.20 | 3.01 | 2.44 | 1.85 |

While the present teachings have been illustrated with respect to one or more implementations, alterations and/or modifications may be made to the illustrated examples without departing from the spirit and scope of the appended claims. It will be appreciated that structural components and/or processing stages may be added or existing structural components and/or processing stages may be removed or modified. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A tube structure for packaging products, comprising:
a tube body and a tube closing crimp; and
a tube shoulder and nozzle comprised of a barrier material blend,
wherein the barrier material blend comprises high density polyethylene (HDPE), ethylene vinyl alcohol copolymer (EVOH) and cyclic olefin copolymer (COC), wherein the COC is made from ethylene and norbornene.

2. The tube structure of claim 1, wherein the HDPE in the barrier material blend is present in an amount of 60 wt % to 90 wt %.

3. The tube structure of claim 1, wherein the EVOH in the barrier material blend is present in an amount of 5 wt % to 20 wt %.

4. The tube structure of claim 1, wherein the COC in the barrier material blend is present in an amount of 5 wt % to 20 wt %.

5. The tube structure of claim 1, wherein the barrier material blend is moldable.

6. The tube structure of claim 1, wherein the barrier material blend comprises a blend ratio for HDPE/EVOH/COC of 60/20/20 to 90/5/5 by weight.

7. The tube structure of claim 1, wherein permeability of limonene in the tube shoulder and nozzle is less than $3.00 \times 10^{-10}$ g·cm/cm$^2$·s.

8. The tube structure of claim 1, wherein the tube has a tube volume less than or equal to 50 mL.

9. The tube structure of claim 1, wherein the shoulder and nozzle does not comprise a separate barrier insert.

10. The tube structure of claim 1, wherein the shoulder and nozzle is molded from a tri-component barrier resin composition comprising the HDPE, EVOH and COC.

11. The tube structure of claim 1, wherein the shoulder and nozzle has a thickness between 350 microns to 650 microns.

12. A method of making the tube shoulder and nozzle of the tube structure of claim 1, comprising:
forming a resin blend composition comprising high density polyethylene (HDPE), ethylene vinyl alcohol (EVOH) copolymer and cyclic olefin copolymer (COC), wherein the COC is made from ethylene and norbornene; and molding the resin blend composition into the tube shoulder and nozzle.

13. The method of claim 12, wherein the HDPE in the molded resin blend composition is present in an amount of 60 wt % to 90 wt %, wherein the EVOH in the molded resin blend composition is present in an amount of 5 wt % to 20 wt %, and wherein the COC in the molded resin blend composition is present in an amount of 5 wt % to 20 wt %.

14. The method of claim 12, wherein the molded resin blend composition comprises a blend ratio for HDPE/EVOH/COC of 60/20/20 to 90/5/5 by weight.

15. The method of claim 12, wherein no separate barrier insert is laminated to an inside surface of the shoulder and nozzle.

* * * * *